US009024465B2

(12) United States Patent
Guo

(10) Patent No.: US 9,024,465 B2
(45) Date of Patent: May 5, 2015

(54) UNINTERRUPTIBLE POWER SYSTEM

(75) Inventor: Xing-Kuan Guo, Shanghai (CN)

(73) Assignee: Delta Electronics (Shanghai) Co., Ltd., Shanghai (CH)

(*) Notice: Subject to any disclaimer, the term of this patent is extended or adjusted under 35 U.S.C. 154(b) by 610 days.

(21) Appl. No.: 13/363,103

(22) Filed: Jan. 31, 2012

(65) Prior Publication Data

US 2013/0076143 A1 Mar. 28, 2013

(30) Foreign Application Priority Data

Sep. 27, 2011 (CN) .......................... 2011 1 0300612

(51) Int. Cl.
*H02J 3/18* (2006.01)
*H02J 9/04* (2006.01)
*H02J 9/06* (2006.01)
*H02M 1/42* (2007.01)
*H02M 3/335* (2006.01)
*H02M 3/337* (2006.01)
*H02J 3/02* (2006.01)

(52) U.S. Cl.
CPC ............... *H02J 3/1814* (2013.01); *H02J 9/04* (2013.01); *H02J 9/061* (2013.01); *H02M 1/4225* (2013.01); *H02M 3/33592* (2013.01); *H02M 3/337* (2013.01); *Y02B 70/126* (2013.01); *Y02B 70/1475* (2013.01); *Y02E 40/18* (2013.01)

(58) Field of Classification Search
USPC ........................................................ 307/2, 64
See application file for complete search history.

(56) References Cited

U.S. PATENT DOCUMENTS

| 5,477,091 | A | 12/1995 | Fiorina et al. | |
|---|---|---|---|---|
| 2005/0207192 | A1* | 9/2005 | Fu et al. | 363/89 |
| 2007/0274113 | A1* | 11/2007 | Wang et al. | 363/109 |
| 2008/0253154 | A1 | 10/2008 | Schiene et al. | |
| 2011/0213999 | A1 | 9/2011 | Lecourtier | |
| 2013/0020872 | A1* | 1/2013 | Kinnard | 307/64 |

FOREIGN PATENT DOCUMENTS

| CN | 101263439 B | 8/2010 |
|---|---|---|
| CN | 101969267 A | 2/2011 |
| TW | 201021358 A | 6/2010 |

* cited by examiner

*Primary Examiner* — Robert L. Deberadinis
(74) *Attorney, Agent, or Firm* — CKC & Partners Co., Ltd.

(57) ABSTRACT

The present invention provides an uninterruptible power system (UPS), the UPS comprising: a first converter having a first input terminal for receiving a first power source and a first output terminal for outputting a first voltage, wherein the first power source is a DC power or AC power and the first voltage is a DC voltage; a third converter having a third input terminal for receiving the second power source and the third output terminal connected to the first output terminal, wherein the second power source is a DC power; and a second converter having a second input terminal connected to the first output terminal and the third output terminal, and the second output terminal for outputting a second voltage corresponding to the first voltage.

45 Claims, 11 Drawing Sheets

UNINTERRUPTIBLE POWER SYSTEM

RELATED APPLICATIONS

This application claims priority to Chinese Application Serial Number 201110300612.9, filed Sep. 27, 2011, which is herein incorporated by reference.

BACKGROUND

1. Field of Invention

The present invention relates to a UPS (Uninterruptible Power System) server, and more particularly relates to a power system for a UPS server.

2. Description of Related Art

UPS (Uninterruptible Power System) is a constant voltage and constant frequency AC power supply, which includes an energy storage device and mainly consists of a rectifier and an inverter. The UPS provides an uninterrupted power supply by mainly using an energy storage device such as a battery for a computer, a communication network system or an industrial control system like a computer/server, a storage device, a network equipment and industrial equipment that requires continuous operation. For example, when city power is inputted normally, the UPS first stabilizes the city power and then provides for a load. Herein, the UPS is equivalent to an AC power stabilizer, and meanwhile the UPS charges an energy storage device (such as a battery cell). When the city power is interrupted, the UPS instantly provides the electrical energy stored in the energy storage device to the load by inversion conversion so as to continuously supply the AC power to keep the load working normally and to protect software and hardware of the load from being damaged.

For a UPS server, its output power source generally is a low-voltage, high-current DC power source, and thus the design of the power system in the UPS server is crucial. Specifically, factors of the power system including UPS efficiency, an input power factor, an input resonant current content and inversion and bypass switching time are important performance parameters. It is quite a common solution employed in the prior art to input a 380V three-phase AC voltage to a high-voltage power supply which is formed from an AC/DC converter and an isolated DC/DC converter connected in series. Firstly, the AC/DC converter converts a 380V AC voltage to a DC voltage, and the DC voltage is stepped down to generate a low DC voltage. After a DC PDU (Power Distribution Unit) is adopted to make a reasonable distribution, the required DC power voltage is obtained.

In another solution, the 380V three-phase AC voltage is distributed by an AC PDU in a reasonable way to obtain a 220V single-phase AC voltage. Then, the single-phase AC voltage is inputted to a server power supply which is formed from a low-voltage AC/DC converter and an isolating DC/DC converter connected in series. However, it is revealed from the above two solutions that the current UPS can only accept an AC input manner and the battery for storing power has to meet the requirement of large capacity (e.g. 240VDC). Furthermore, the current UPS needs several steps of conversion from AC to DC and from DC to DC, which inevitably reduce the efficiency of the UPS and further influence the performance of the UPS.

In view of the above, it is a problem desired to be solved by this industry regarding how to design an efficient power system for the UPS server, so as to eliminate or reduce the deficiencies or defects mentioned above.

SUMMARY

An object of the present invention is to provide a UPS which is applicable to a server power supply system.

To achieve the above object, a technical aspect of the present invention relates to a UPS, and the UPS includes a first converter, a third converter and a second converter. The first converter has a first input terminal for receiving a first power source and a first output terminal for outputting a first voltage. The first power source is a DC power or an AC power and the first voltage is a DC voltage. The third converter has a third input terminal for receiving a second power source and a third output terminal electrically connected to the first output terminal. The second power source is a DC power. The second converter has a second input terminal electrically connected to the first output terminal and the third output terminal, and a second output terminal for outputting a second voltage corresponding to the first voltage.

Preferably, the UPS further includes an auxiliary power source module and a control module. The auxiliary power source module is electrically connected to one of the first input terminal, the third input terminal and the first output terminal, thereby receiving one of the first power source, the second power source and the first voltage correspondingly. The control module is electrically connected to the auxiliary power source module for receiving a power supply source from the auxiliary power source module.

Preferably, the UPS further includes a converter control module having three input terminals and three output terminals. The three input terminals are respectively electrically connected to the first converter, the second converter and the third converter for receiving respective electrical signals, and three output terminals are used for outputting control signals corresponding to the electrical signals respectively.

Preferably, the UPS further includes three converter control modules. The converter control modules have respective input terminals electrically connected to the first converter, the second converter and the third converter respectively for receiving respective electrical signals, and respective output terminals for outputting control signals corresponding to the electrical signals respectively. More preferably, a control method for the first converter and the second converter is a close-loop control, and a control method for the third converter is an open-loop control or a close-loop control.

Preferably, the third converter is a PWM converter or a resonant converter. More preferably, the third converter is a resonant converter, and the resonant converter includes a square-wave generator for outputting a square wave; a resonant slot electrically connected to the square-wave generator; a transformer having a primary winding electrically connected to the resonant slot and at least one secondary winding; and a rectifier module electrically connected to the secondary winding of the transformer, thereby rectifying a voltage of the secondary winding.

In an embodiment, the square-wave generator is a half-bridge square-wave generator or a full-bridge square-wave generator. In another embodiment, a resonance method of the resonant slot is serial resonance, parallel resonance or LLC resonance.

Preferably, the third converter further includes a filter module for filtering the second power source. In an embodiment, the filter module further includes an EMI filter for performing common-mode filtering and/or differential-mode filtering on the second power source. In another embodiment, the filter module further includes a surge current detection device for detecting a surge current when the second power source is inputted to the third input terminal and for performing surge current protection on the third converter. In still another embodiment, the filter module further includes a voltage polarity detection device for detecting if a voltage polarity of the second power source matches a terminal polarity of the third input terminal, so as to protect the third converter when the input terminal of the second power source is reversed.

Preferably, the first converter further includes a PFC (Power Factor Correction) circuit for adjusting a power factor of the first converter. More preferably, the first converter is an interleaved PFC circuit for adjusting a power factor of the first converter and reducing a ripple component of the output voltage.

Preferably, the first converter further includes a surge current protection device for detecting a transient surge current during the actuation of the first power source and for performing surge current protection on the first converter.

Preferably, the second converter is a resonant converter or a PWM converter. More preferably, the second converter is a resonant converter, and the resonant converter includes a square-wave generator for outputting a square wave; a resonant slot electrically connected to the square-wave generator; a transformer having a primary winding electrically connected to the resonant slot and at least one secondary winding; and a rectifier module electrically connected to the secondary winding of the transformer for rectifying a voltage of the secondary winding. More preferably, the second converter is a phase-shifted full-bridge converter, and the phase-shifted full-bridge converter includes a phase-shifted square-wave generator for outputting a square wave; a transformer having a primary winding electrically connected to an output terminal of the phase-shifted square-wave generator and a secondary winding; and a synchronous rectifier module electrically connected to the secondary winding for performing synchronous rectification on an output voltage of the transformer.

A technical aspect of the present invention relates to a UPS, and the UPS includes a first converter, a third converter and at least one second converter. The first converter has a first input terminal for receiving a first power source and a first output terminal for outputting a first voltage. The first power source is a DC power or an AC power and the first voltage is a DC voltage. The third converter has a third input terminal for receiving a second power source and a third output terminal electrically connected to the first output terminal. The second power source is a DC power. Each second converter includes an isolation unit having a first isolation side electrically coupled to the first output terminal for receiving the first voltage and a second isolation side; and a synchronous rectifier module electrically connected to the second isolation side for performing synchronous rectification on an output voltage of the isolation unit.

Preferably, each of the at least one second converter is electrically connected to an output bus by an ORing field effect transistor, and the ORing field effect transistors are controlled by an ORing field effect transistor controller. The ORing field effect transistor prevents the current from flowing back to the second output terminal of the corresponding second converter.

Preferably, the UPS further includes an auxiliary power source module and a control module. The auxiliary power source module is electrically connected to one of the first input terminal, the third input terminal and the first output terminal, thereby receiving one of the first power source, the second power source and the first voltage correspondingly. The control module is electrically connected to the auxiliary power source module for receiving a power supply source from the auxiliary power source module.

Preferably, the UPS further includes a converter control module having three input terminals and three output terminals. The three input terminals are respectively electrically connected to the first converter, the second converter and the third converter for receiving respective electrical signals, and the three output terminals are used for outputting control signals corresponding to the electrical signals respectively.

Preferably, the UPS further includes three converter control modules. The converter control modules have respective input terminals electrically connected to the first converter, the second converter and the third converter respectively for receiving respective electrical signals, and respective output terminals for outputting control signals corresponding to the electrical signals respectively. More preferably, a control method for the first converter and the second converter is a close-loop control, and a control method for the third converter is an open-loop control or a close-loop control.

Preferably, the first converter further includes a PFC circuit for adjusting a power factor of the first converter. More preferably, the first converter is an interleaved PFC circuit for adjusting a power factor of the first converter and reducing a ripple component of the output voltage.

Preferably, the first converter further includes a surge current protection device for detecting a transient surge current during the actuation of the first power source and for performing surge current protection on the first converter.

A technical aspect of the present invention relates to a UPS, and the UPS includes a first converter, a third converter and a second converter. The first converter has a first input terminal for receiving a first power source and a first output terminal for outputting a first voltage. The first power source is a DC power or an AC power and the first voltage is a DC voltage. The third converter has a third input terminal for receiving a second power source and a third output terminal electrically connected to the first output terminal. The second power source is a DC power. The second converter has a second input terminal electrically connected to the first output terminal and the third output terminal, and a second output terminal for outputting a second voltage corresponding to the first voltage. The output voltage of the third output terminal varies in accordance with a variation of the DC power received by the third input terminal.

Preferably, the UPS further includes an auxiliary power source module and a control module. The auxiliary power source module is electrically connected to one of the first input terminal, the third input terminal and the first output terminal, thereby receiving one of the first power source, the second power source and the first voltage correspondingly. The control module is electrically connected to the auxiliary power source module for receiving a power supply source from the auxiliary power source module.

Preferably, the UPS further includes a converter control module having three input terminals respectively electrically connected to the first converter, the second converter and the third converter for receiving respective electrical signals, and three output terminals for respectively outputting control signals corresponding to the electrical signals respectively.

Preferably, the UPS further includes three converter control modules, the converter control modules having respective input terminals electrically connected to the first converter, the second converter and the third converter respectively for receiving respective electrical signals, and respective output terminals for outputting control signals corresponding to the electrical signals respectively.

Preferably, the third converter is a resonant converter. More preferably, the resonant converter includes a square-wave generator for outputting a square wave; a resonant slot electrically connected to the square-wave generator; a transformer having a primary winding electrically connected to the resonant slot and at least one secondary winding; and a rectifier module electrically connected to the secondary winding of the transformer for rectifying a voltage of the secondary winding. The square-wave generator is a half-bridge square-wave generator or a full-bridge square-wave generator. A resonance method of the resonant slot is serial resonance, parallel resonance or LLC resonance.

Preferably, the third converter further includes a filter module for filtering the second power source. The filter module further includes an EMI filter for performing common-mode filtering and/or differential-mode filtering on the second power source. The filter module further includes a surge current detection device for detecting a surge current when the second power source is inputted to the third input terminal and for performing surge current protection on the third converter. The filter module further includes a voltage polarity detection device for detecting if the voltage polarity of the second power source matches a terminal polarity of the third input terminal, so as to protect the third converter when the input terminal of the second power source is reversed.

A technical aspect of the present invention relates to a UPS, and the UPS includes a first power source module and a second converter. The first power source module includes a first converter and a third converter. The first converter has a first input terminal for receiving a first power source and a first output terminal for outputting a first voltage. The first power source is a DC power or an AC power and the first voltage is a DC voltage. The third converter is electrically coupled to the first converter for receiving a second power source. The second power source is a DC power. The second converter has a second input terminal electrically connected to the first output terminal of the first converter for receiving the first voltage, and a second output terminal for outputting a second voltage corresponding to the first voltage.

Preferably, the first converter further includes a filter module for filtering the first power source.

Preferably, the second power source is a battery.

Preferably, the UPS supplies power to the server.

Preferably, the first converter further includes a rectifier module having an input terminal electrically connected to an output terminal of the filter module for rectifying the filtered first power source; and an output terminal electrically connected to the third converter. More preferably, the first converter further includes a PFC circuit electrically connected to the output terminal of the rectifier module and the third converter, thereby adjusting a power factor of the first power source module. Furthermore, the PFC circuit is an interleaved PFC circuit for adjusting a power factor of the first power source module and reducing a ripple component of the voltage.

In the application of the UPS of the present invention, the first converter converts the input AC power or DC power into the high-voltage DC power, and the second converter converts the high-voltage DC power into the low-voltage DC power. Meanwhile, the output terminal of the third converter is electrically connected to the output terminal of the first converter, so as to convert the DC input of the third converter into the required voltage for the second converter, which may greatly improve the working efficiency of the UPS. In addition, the second converter may adopt an isolation conversion and synchronous rectification design, so as to further reduce the system loss. In addition, the third converter may adopt an open-loop control method, so that the output of the third converter varies in accordance with the variation of the input, thereby adjusting the first voltage inputted to the second converter and enhancing the adjustment flexibility of the UPS.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
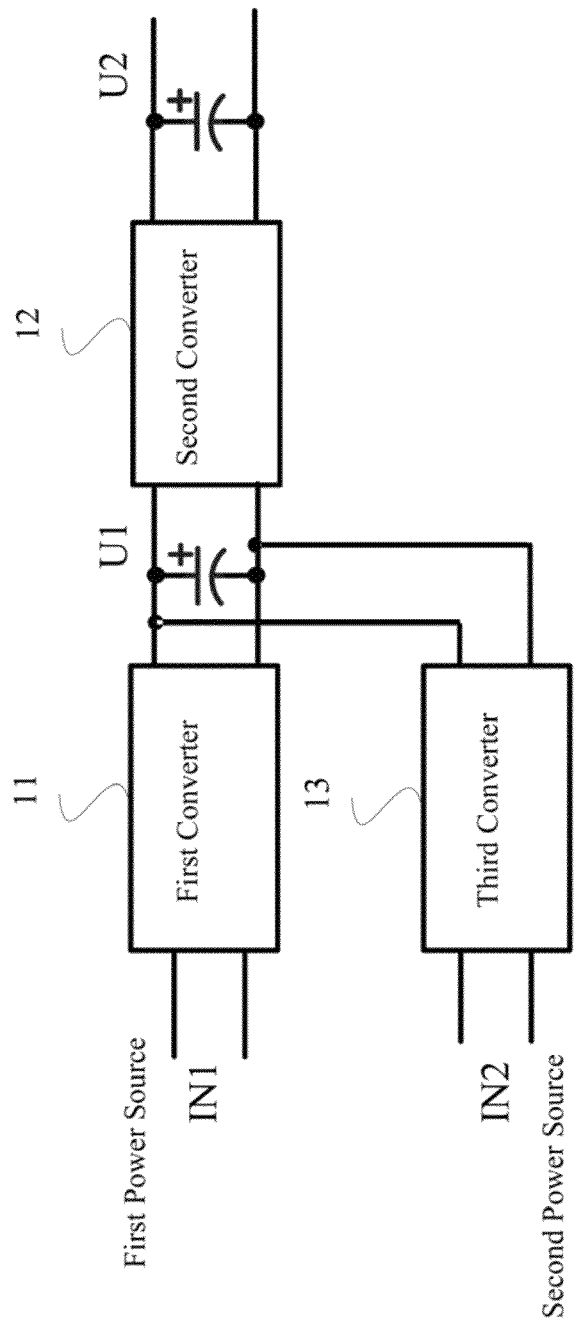
FIG. 1 is a structure diagram of a UPS according to an aspect of the present invention.

Hereinafter, specific embodiments of the present invention are sufficiently explained with reference to the drawings.

In order to make the description of the present invention more detailed and more comprehensive, various embodiments are described below with reference to the accompanying drawings, wherein like reference numerals refer to like elements throughout. However, these embodiments are not intended to limit the present invention. The description of structure operation does not mean to limit its implementation order. Any device with equivalent functions that is produced from a structure formed by recombination of elements shall fall within the scope of the present invention.

The drawings are only illustrative and are not made according to the original size. In addition, well-known elements and steps are not described in the embodiments to avoid causing unnecessary limitations to the present invention.

FIG. 1 is a structure diagram of a UPS for a UPS according to an aspect of the present invention. Referring to FIG. 1, the UPS includes a first converter 11, a second converter 12 and a third converter 13. The first converter 11 includes a first input terminal IN1 for receiving a first power source and a first output terminal for outputting a first voltage U1 (e.g. 400V) after the first power source is processed by the first converter 11. The third converter 13 includes a third input terminal IN2 for receiving a second power source and a third output terminal electrically connected to the first output terminal. It should be particularly noted that the first power source inputted to the first converter 11 is a DC power or an AC power, and the second power source inputted to the third converter 13 is a DC power (e.g. battery).

The second converter 12 includes a second input terminal and a second output terminal. The second input terminal is electrically connected to the first output terminal and the third output terminal, and the second output terminal outputs a second voltage U2 (e.g. 12V) corresponding to the first voltage U1. As shown in FIG. 1, when the first power source inputted to the first converter 11 is normal, after the first power source is processed by the first converter 11, the AC or DC first power source is converted into the first voltage U1, and then the first voltage U1 (generally a high value voltage) is converted into the second voltage U2 (generally a low value voltage) by the second converter 12. On the other hand, when the first power source inputted to the first converter 11 is abnormal, the UPS of the present invention may input the second power source to the third converter 13, after the second power source is processed by the third converter 13, the DC second power source is converted into the first voltage U1, and then the first voltage U1 is converted into the second voltage U2 by the second converter 12, thereby achieving the uninterrupted power supply source for the UPS server.

It would be understood by those skilled in the art that for effectively filtering the output voltage of the converter, an electrolytic capacitor may be further jumped at the first output terminal of the first converter 11, and an electrolytic capacitor may be jumped at the second output terminal of the second converter 12.

Figure 2:
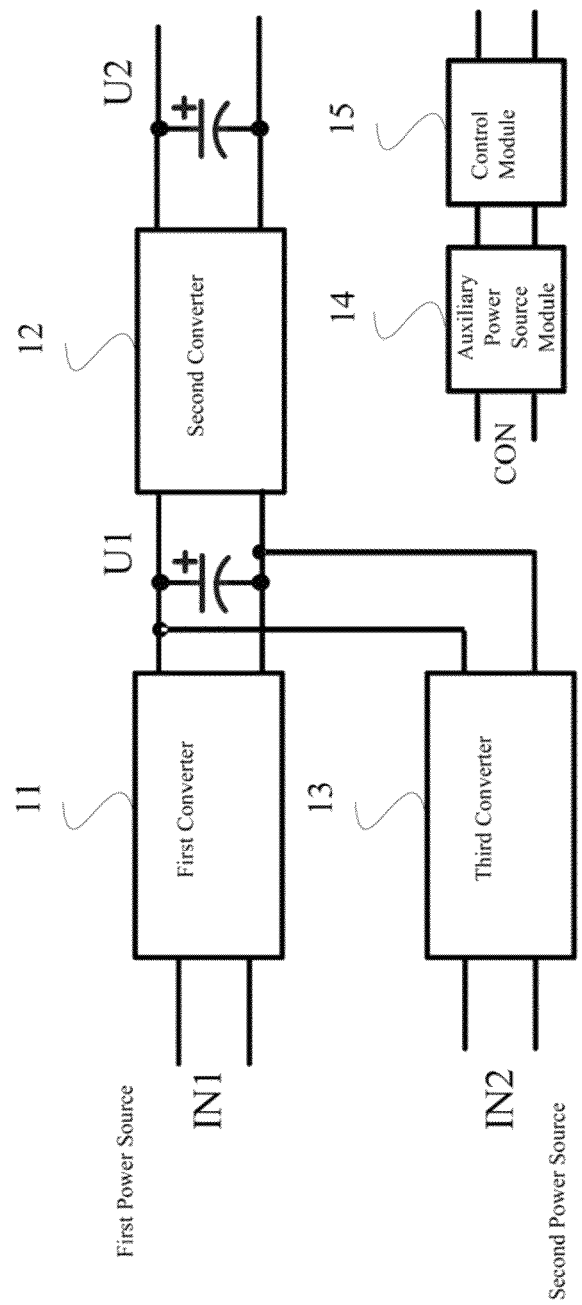
FIG. 2 is a structure diagram of the UPS in FIG. 1 according to a first preferred embodiment.

FIG. 2 is a structure diagram of the UPS in FIG. 1 according to a first preferred embodiment. Referring to FIG. 2, the UPS may further include an auxiliary power source module 14 and a control module 15. The input terminal CON of the auxiliary power source module 14 is electrically connected to one of the first input terminal IN1 of the first converter 11, the third input terminal IN2 of the third converter 13 and the first output terminal of the first converter 11, thereby receiving one of the first power source, the second power source and the first voltage U1 correspondingly. For example, the input terminal CON of the auxiliary power source module 14 is electrically connected to the first input terminal IN1 of the first converter 11, and after conversion, the auxiliary power source module 14 outputs a DC voltage corresponding to the first power source to serve as the power supply source of the control module 15. As another example, the input terminal CON of the auxiliary power source module 14 is electrically connected to the first output terminal of the first converter 11 (or the third output terminal of the third converter 13), and after conversion, the auxiliary power source module 14 outputs a DC voltage corresponding to the first voltage U1 to serve as the power supply source of the control module 15.

In a specific embodiment, the control module 15 is a converter control module having three input terminals and three output terminals. The three input terminals are respectively electrically connected to the first converter 11, the second converter 12 and the third converter 13, thereby receiving the respective electrical signal, such as a voltage signal, a current signal or a power signal; and the three output terminals output control signals corresponding to the electrical signal respectively.

Figure 3:
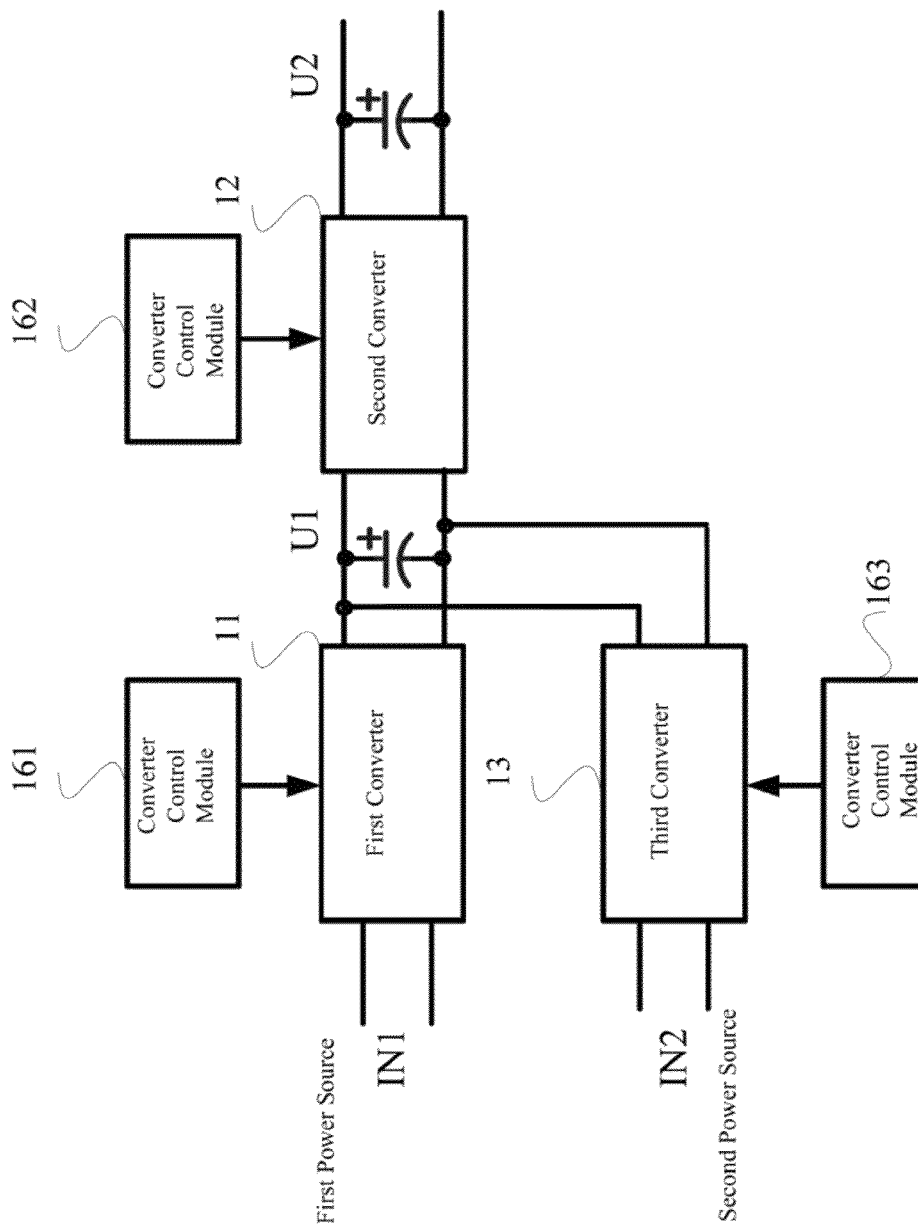
FIG. 3 is a structure diagram of the UPS in FIG. 1 according to a second preferred embodiment.

FIG. 3 is a structure diagram of the UPS in FIG. 1 according to a second preferred embodiment. Referring to FIG. 3, the UPS may further include three converter control modules 161, 162 and 163. The converter control modules 161, 162 and 163 have respective input terminals electrically connected to the first converter 11, the second converter 12 and the third converter 13 respectively for receiving the respective electrical signals, and respective output terminals for respectively outputting control signals corresponding to the electrical signals. For example, the converter control module 161 controls the first converter 11 correspondingly, the converter control module 162 controls the second converter 12 correspondingly, and the converter control module 163 controls the third converter 13 correspondingly.

In a specific embodiment, the control method for the converter control module 161 of the first converter 11 and the converter control module 162 of the second converter 12 is a close-loop control, and the control method for the converter control module 163 of the third converter 13 is an open-loop control or a close-loop control. That is, the respective electrical signal of the first converter 11 or the second converter 12 is controlled by the given signal of the corresponding converter control module, and the electrical signal of the third converter 13 is controlled by the given signal of the converter control module, or the output signal of the third converter 13 varies in accordance with the variation of the input signal of the third converter.

Figure 4:
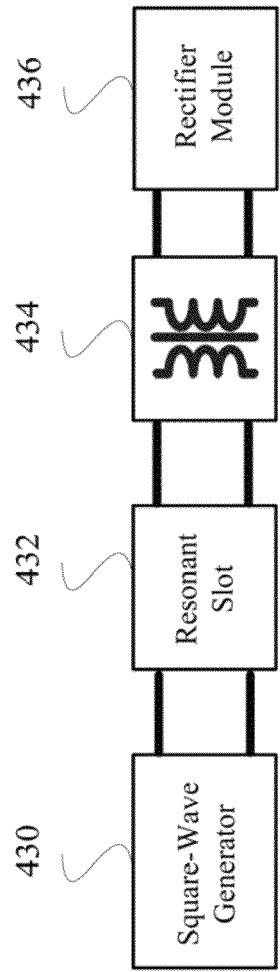
FIG. 4 is a structure diagram of a third converter of the UPS in FIG. 1 according to a preferred embodiment.

FIG. 4 is a structure diagram of a third converter of the UPS in FIG. 1 according to a preferred embodiment. In a specific embodiment, the third converter of the UPS may be a PWM (Pulse Width Modulation) converter. In another specific embodiment, the third converter of the UPS may also be a resonant converter. Referring to FIG. 4, when the third converter 13 is realized by the resonant converter, the resonant converter includes a square-wave generator 430, a resonant slot 432, a transformer 434 and a rectifier module 436. The square-wave generator 430 outputs a square wave. For example, the square-wave generator 430 may be a half-bridge square-wave generator or a full-bridge square-wave generator. The resonant slot 432 is electrically connected to the square-wave generator. For example, the resonance method of the resonant slot 432 may be serial resonance, parallel resonance or LLC resonance. The transformer 434 has a primary winding electrically connected to the resonant slot 432 and at least one secondary winding electrically connected to the rectifier module 436, thereby rectifying the voltage generated on the secondary winding.

Figure 5:
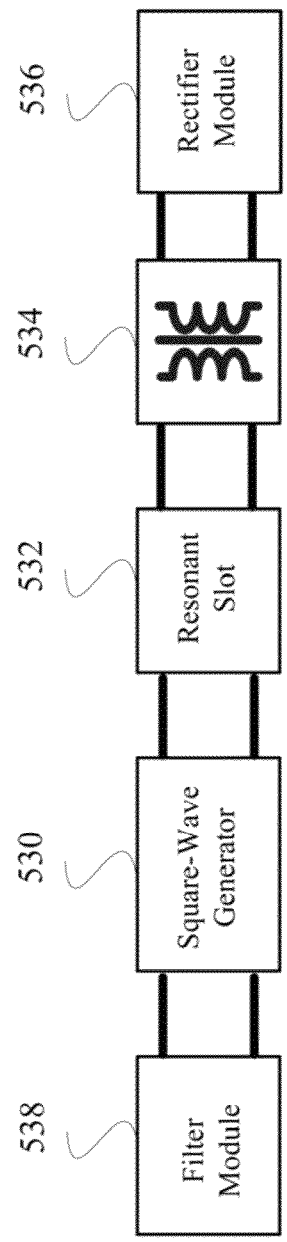
FIG. 5 is a structure diagram of the third converter of the UPS in FIG. 1 according to another preferred embodiment.

FIG. 5 is a structure diagram of the third converter of the UPS in FIG. 1 according to another preferred embodiment. Similar to FIG. 4, the third converter 13 of the UPS of the present invention includes a square-wave generator 530, a resonant slot 532, a transformer 534 and a rectifier module 536. It can be understood by those skilled in the art that the square-wave generator 530, the resonant slot 532, the transformer 534 and the rectifier module 536 in FIG. 5 may adopt the same or similar circuit structure of the square-wave generator 430, the resonant slot 432, the transformer 434 and the rectifier module 436 in FIG. 4, and no further description will be given herein for sake of convenient description.

Different from FIG. 4, the third converter 13 further includes a filter module 538 for filtering the second power source inputted to the third converter 13. In a specific embodiment, the filter module 538 further includes an EMI (Electro Magnetic Interference) filter (not shown) for performing common-mode filtering and/or differential-mode filtering on the second power source. In another specific embodiment, the filter module 538 further includes a surge current detection device (not shown) for detecting a surge current when the second power source is inputted to the third input terminal of the third converter 13, and for performing surge current protection on the third converter 13.

In still another specific embodiment, the filter module 538 further includes a voltage polarity detection device (not shown) for detecting if a voltage polarity of the second power source matches a terminal polarity of the third input terminal, so as to protect the third converter 13 when the input terminal of the second power source is reversed. Specifically, the second power source has a positive electrode and a negative electrode; and the third input terminal has a positive electrode terminal and a negative electrode terminal. When the positive electrode of the second power source is connected to the positive electrode terminal of the third input terminal, and the negative electrode of the second power source is connected to the negative electrode terminal of the third input terminal, the third converter 13 works normally to convert the second power source into the first voltage. When the positive electrode of the second power source is connected to the negative electrode terminal of the third input terminal, and the negative electrode of the second power source is connected to the positive electrode terminal of the third input terminal, the voltage polarity detection device may detect that the positive and negative electrodes of the second power source are reversed, and then protect the third converter 13.

Figure 6:
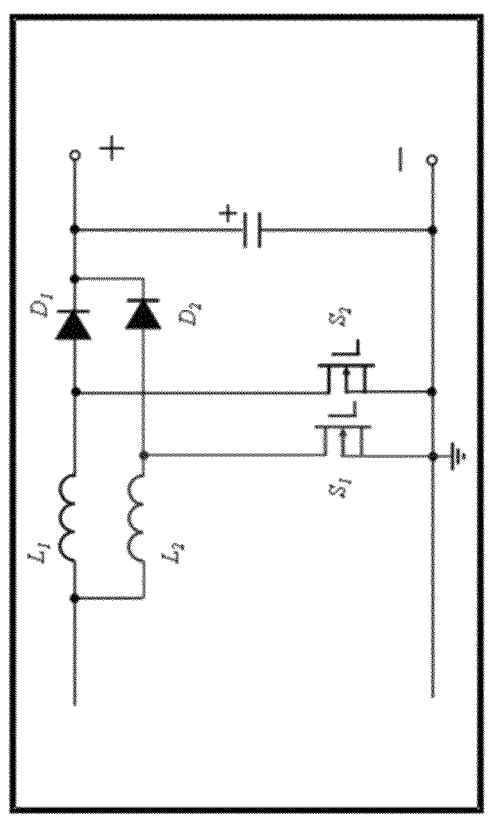
FIG. 6 is a schematic circuit diagram of a PFC circuit of a first converter of the UPS in FIG. 1.

FIG. 6 is a schematic circuit diagram of a PFC (Power Factor Correction) circuit of the first converter of the UPS in FIG. 1. The first converter 11 further includes a PFC circuit for adjusting a power factor of the first converter 11. Preferably, the first converter 11 is an interleaved PFC circuit for reducing a ripple component of the output voltage while adjusting the power factor of the first converter 11.

Hereinafter, the working principle of the interleaved PFC circuit is described in brief. In the interleaved PFC circuit, two PFCs with low power (power of the respective PFC is a half of the power of a single PFC circuit) are placed at a position where the single PFC circuit with high power is placed. The two PFCs with low power are for example, a first PFC circuit (formed from an inductive element L1, a diode D1 and a power switch S2) and a second PFC circuit (formed from an inductive element L2, a diode D2 and a power switch S1) in FIG. 6. The two PFC circuits with low power work with 180° phase shift, and when the output wave forms of the two PFC circuits overlap, a major part of the current ripple of each PFC circuit is cancelled, thereby achieving the effect of reducing a ripple component of the output.

In a specific embodiment, the first converter 11 further includes a surge current protection device (not shown) for detecting a transient surge current during the actuation of the first power source and for performing surge current protection on the first converter 11.

Figure 7:
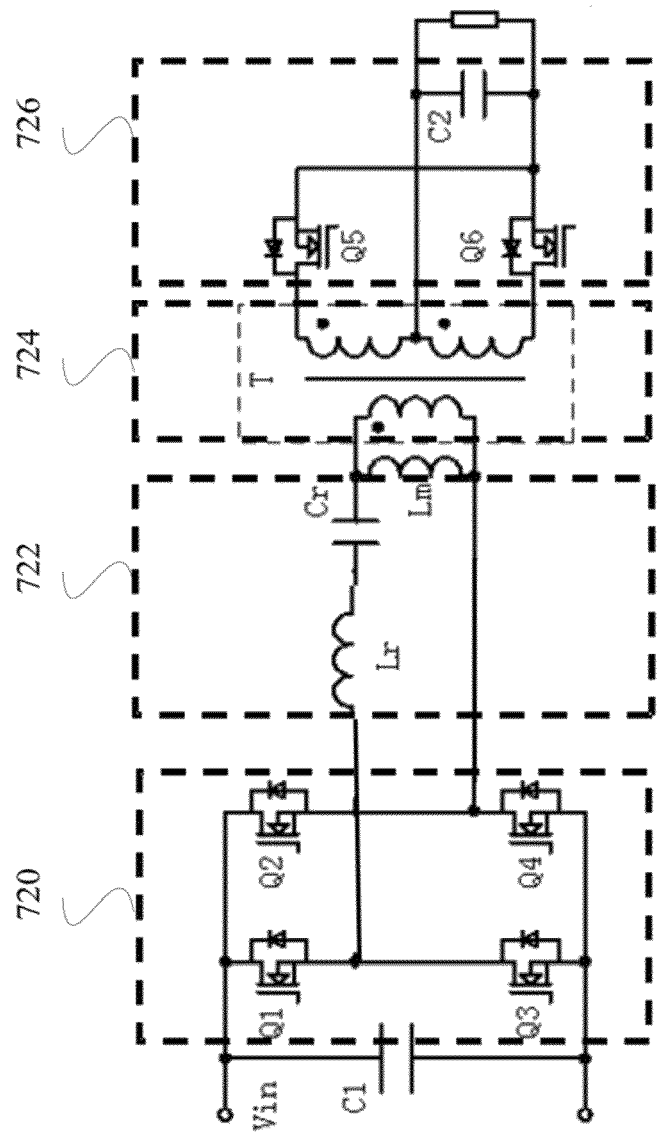
FIG. 7 is a schematic circuit diagram of a resonant converter of a second converter of the UPS in FIG. 1 according to a specific embodiment.

FIG. 7 is a schematic circuit diagram of a resonant converter of the second converter of the UPS in FIG. 1 according to a specific embodiment. The second converter 12 of the UPS may adopt a resonance structure of the resonant converter and may also adopt a PWM structure of the PWM converter. Referring to FIG. 7, the resonant converter includes a square-wave generator 720, a resonant slot 722, a transformer 724 and a rectifier module 726. The square-wave generator 720 is a full-bridge square-wave generator, having a first bridge arm formed from power switches Q1 and Q3 and a second bridge arm formed from power switches Q2 and Q4. The output terminals of the first bridge arm and the second bridge arm are respectively connected to the resonant slot 722, so as to transfer the square-wave signal to the resonant slot 722. The resonant slot 724 is electrically connected to the square-wave generator 720 by, for example, the LLC resonance method, that is, by using inductive elements Lr and the Lm and a capacitor Cr, wherein the inductive element Lr and the capacitor Cr are connected in series; and the inductive element Lm is electrically connected to the capacitor Cr and the output terminal of second bridge arm of the square-wave generator 720.

The transformer 724 has a primary winding and at least one secondary winding. The primary winding is electrically connected to the resonant slot 722; and the secondary windings are electrically connected to the rectifier module 726 for rectifying the voltage generated on the secondary winding. The transformer 724 includes two secondary windings. One end of one winding is electrically connected to the power switch Q5; one end of the other winding is electrically connected to the power switch Q6; and a common end of the two windings is electrically connected to the capacitor C2, thus constructing a rectifier module for performing synchronous rectification on the output voltage of the transformer. It may be known from the above description that in the design of the second converter 12 adopting the resonant converter, the input voltage Vin of the input terminal of the square-wave generator 720 may be set in a wider voltage range, and then is subjected to the square-wave output, resonant process, isolation and rectification, thus outputting the synchronous rectified DC voltage.

Figure 8:
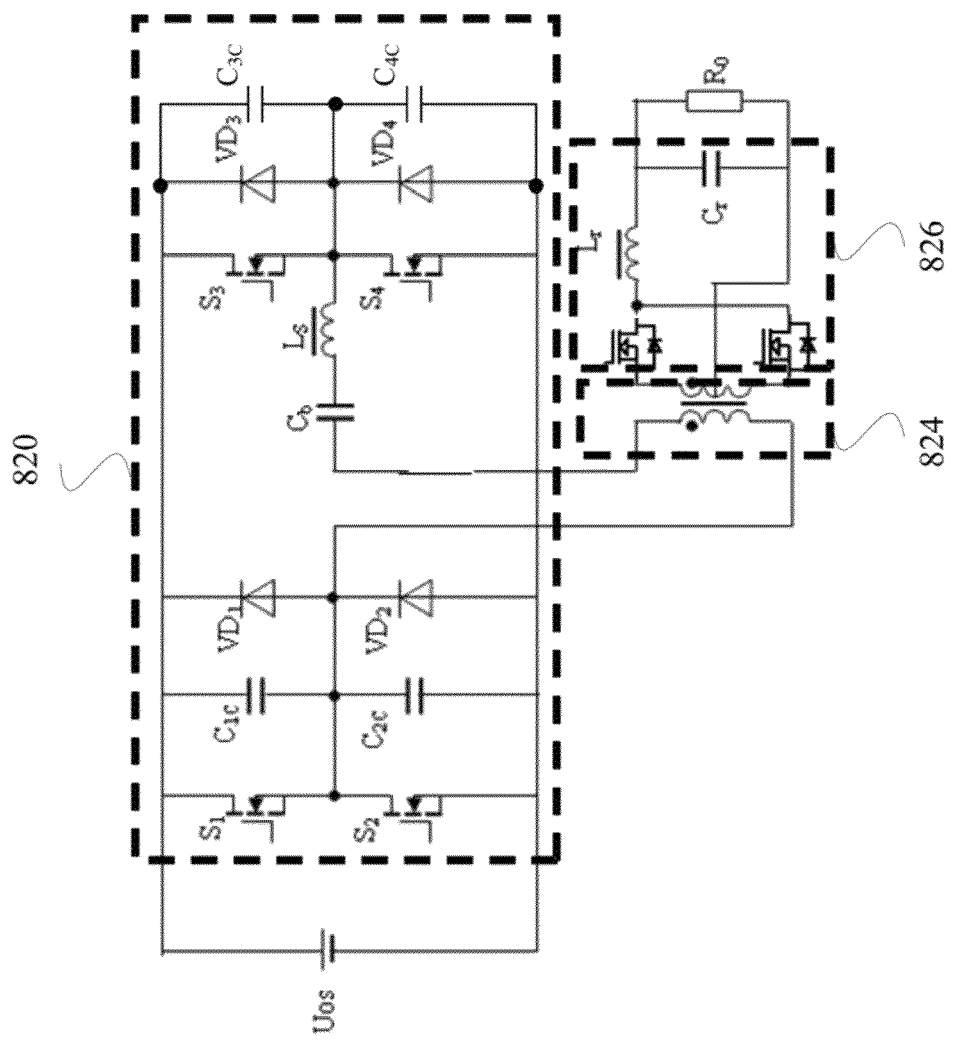
FIG. 8 is a schematic circuit diagram of a PWM converter of the second converter of the UPS in FIG. 1 according to a specific embodiment.

FIG. 8 is a schematic circuit diagram of a PWM converter of the second converter of the UPS in FIG. 1 according to a specific embodiment. Referring to FIG. 8, the second converter 12 is a phase-shifted full-bridge converter, and the phase-shifted full-bridge converter includes a phase-shifted square-wave generator 820, a transformer 824 and a synchronous rectifier module 826. The phase-shifted square-wave generator 820 includes a first circuit (formed from power switches S1 and S2, capacitors C1C and C2C and diodes VD1 and VD2) and a second circuit (formed from power switches S3 and S4, capacitors C3C and C4C, diodes VD3 and VD4, a capacitor Cb and an inductor LS). The phase-shifted square-wave generator 820 outputs a square-wave voltage signal to the primary winding of the transformer 824; and the secondary winding of the transformer 824 is electrically connected to the synchronous rectifier module 826 for performing synchronous rectification on the voltage of the secondary winding. It may be known from the above description that in the design of the second converter 12 adopting the PWM converter, when the input voltage Uos of the input terminal of the phase-shifted square-wave generator 820 is set to a specific input voltage, the square-wave output signal generated by the phase-shifted square-wave generator 820 becomes stable, thereby improving the working efficiency of the second converter 12.

Figure 9:
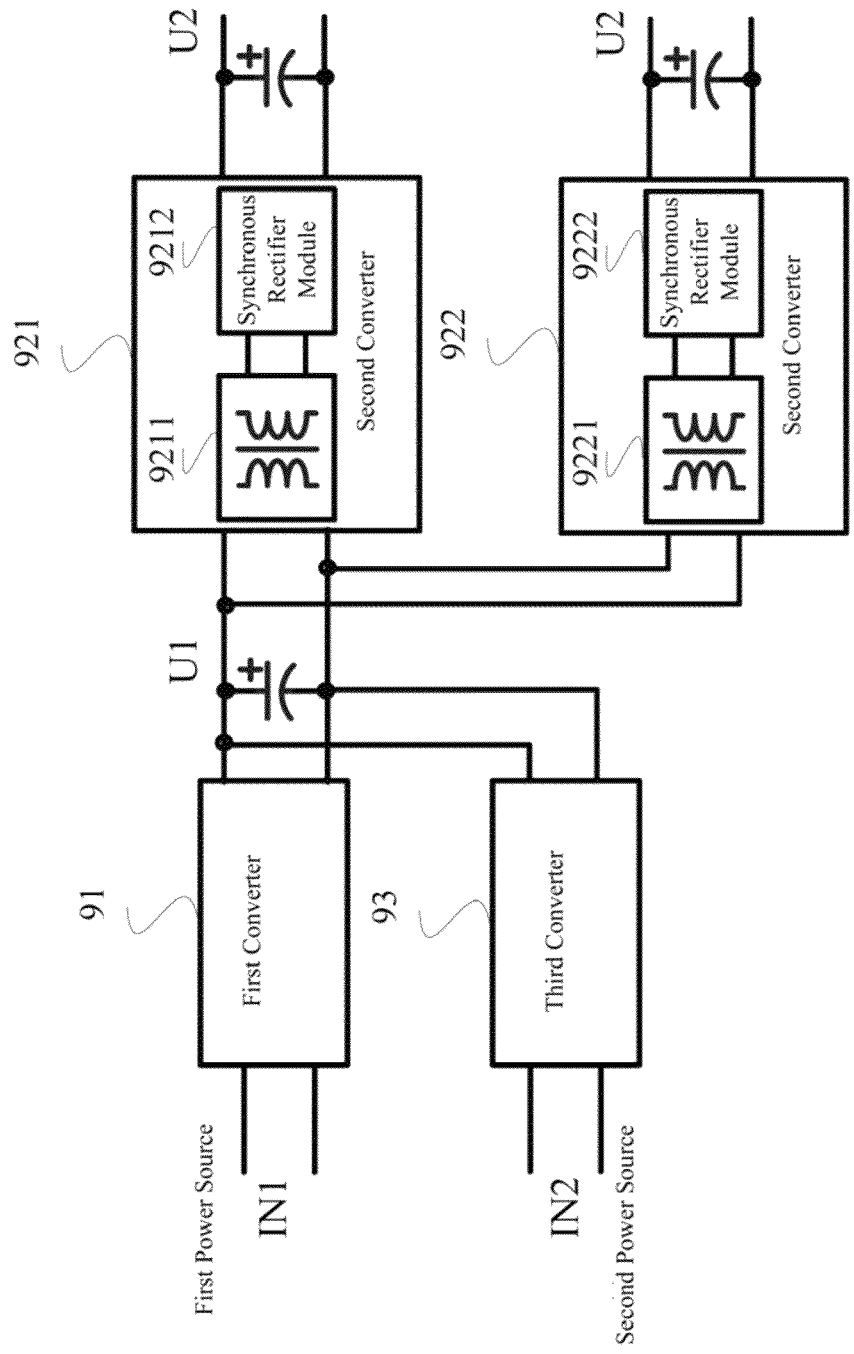
FIG. 9 is a structure diagram of a UPS for a UPS according to another aspect of the present invention.

FIG. 9 is a structure diagram of a UPS according to another aspect of the present invention. Referring to FIG. 9, the UPS includes a first converter 91, second converters 921 and 922, and a third converter 93. The first converter 91 includes a first input terminal IN1 for receiving a first power source and a first output terminal for outputting a first voltage U1 (e.g. 400V) after the first power source is processed by the first converter 91. The third converter 93 includes a third input terminal IN2 for receiving a second power source and a third output terminal electrically connected to the first output terminal. Herein, the first power source inputted to the first converter 91 is a DC power or an AC power, and the second power source inputted to the third converter 93 is a DC power (e.g. battery).

The second converter 921 includes an isolation unit 9211 and a synchronous rectifier module 9212; and the second converter 922 includes an isolation unit 9221 and a synchronous rectifier module 9222. An output terminal of the isolation unit 9211 is connected to an input terminal of the synchronous rectifier module 9212; and an output terminal of the isolation unit 9221 is connected to an input terminal of the synchronous rectifier module 9222. The input terminals of the second converters 921 and 922 are electrically connected to the output terminals of the first converters 91 and third converter 93 respectively, thereby receiving the first voltage U1.

For example, in the second converter 921, the isolation unit 9211 has a first isolation side and a second isolation side. The first isolation side is electrically coupled to the first output terminal of the first converter 91 and the third output terminal of the third converter 93. For example, the isolation unit 9211 is a transformer. The synchronous rectifier module 9212 is electrically connected to the second isolation side of the isolation unit 9211 for performing the synchronous rectification on the output voltage of the isolation unit 9211.

In a specific embodiment, each of the second converters 921 and 922 is electrically connected to an output bus by an ORing field effect transistor (not shown); and the ORing field effect transistors are controlled by an ORing field effect transistor controller. The ORing field effect transistor prevents the current from flowing back to the second output terminal of the corresponding second converter. For example, one ORing field effect transistor is disposed at the output terminal of the second converter 921, so as to prevent the current from flowing back to the second converter 921; and another ORing field effect transistor is disposed at the output terminal of the second converter 922, so as to prevent the current from flowing back to the second converter 922.

Similar to FIG. 1, the UPS in FIG. 9 may also include an auxiliary power source module and a control module. The auxiliary power source module is electrically connected to one of the first input terminal of the first converter 91, the third input terminal of the third converter 93 and the first output terminal of the first converter 91, thereby receiving one of the first power source, the second power source and the first voltage U1 correspondingly. The control module is electrically connected to the auxiliary power source module for receiving the power supply source from the auxiliary power source module.

It would be understood by those skilled in the art that the circuit structures or the converter control modules of the first converter, the second converter and/or the third converter in the other preferred embodiments of FIG. 1 when being applicable to FIG. 9 should be included in the preferred embodiments of the UPS in FIG. 9 and are incorporated by reference herein.

Figure 10:
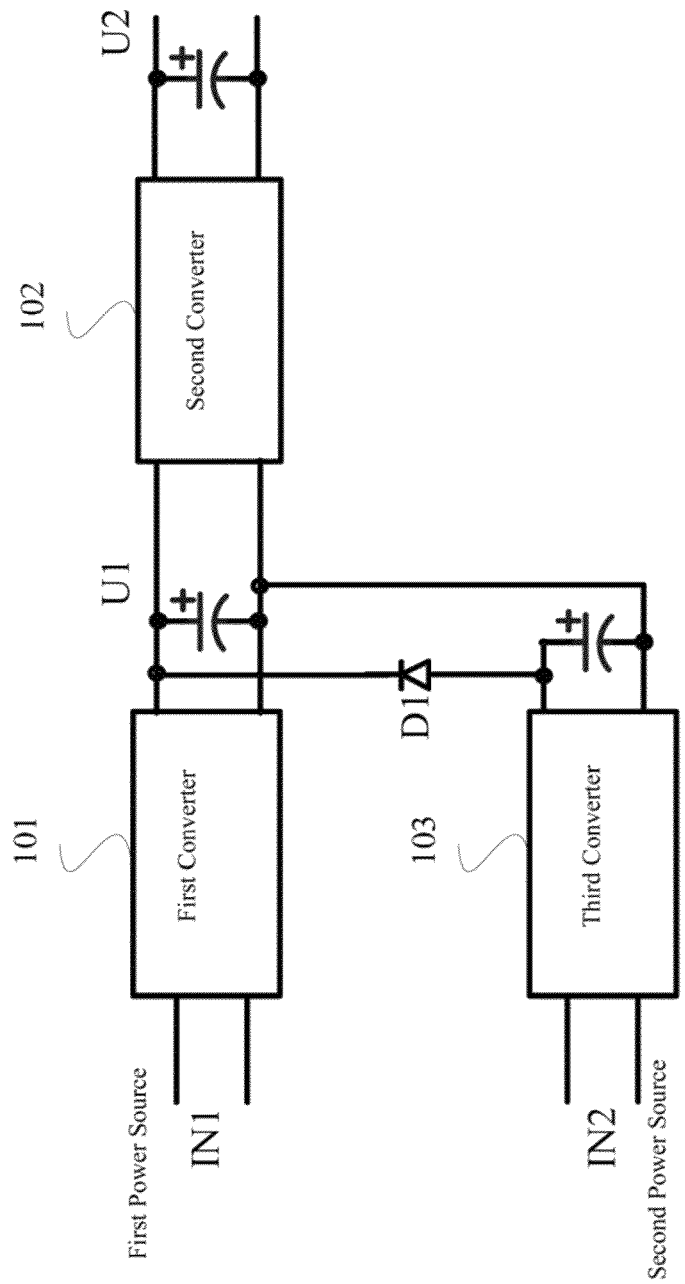
FIG. 10 is a structure diagram of a UPS for a UPS according to still another aspect of the present invention.

FIG. 10 is a structure diagram of a UPS according to still another aspect of the present invention. Referring to FIG. 10, the UPS includes a first converter 101, a second converter 102 and a third converter 103. The first converter 101 includes a first input terminal IN1 for receiving a first power source and a first output terminal for outputting a first voltage U1 (e.g. 400V) after the first power source is processed by the first converter 101. The third converter 103 includes a third input terminal IN2 for receiving a second power source and a third output terminal electrically connected to the first output terminal. Herein, the first power source inputted to the first converter 101 is a DC power or an AC power, and the second power source inputted to the third converter 103 is a DC power (e.g. battery). The output voltage of the third output terminal of the third converter 103 varies in accordance with the variation of the DC power received by the third input terminal. Since the output voltage of the third output terminal of third converter 103 varies in accordance with the variation of the DC power received by the third input terminal, the output voltage of the first converter 101 and the output voltage of the third converter 103 may be different. A unidirectional diode D1 is disposed between the first output terminal and the third output terminal, so as to prevent the output voltage of the first output terminal from transferring to the third output terminal of the third converter 103.

The second converter 102 includes a second input terminal electrically connected to the first output terminal of the first converter 101 and the third output terminal of the third converter 103 and a second output terminal for outputting a second voltage U2 corresponding to the first voltage U1.

Similar to FIG. 1, the UPS in FIG. 10 may also include an auxiliary power source module and a control module. The auxiliary power source module is electrically connected to one of the first input terminal of the first converter 101, the third input terminal of the third converter 103 and the first output terminal of the first converter 101, thereby receiving one of the first power source, the second power source and the first voltage U1 correspondingly. The control module is electrically connected to the auxiliary power source module for receiving the power supply source from the auxiliary power source module.

Figure 11:
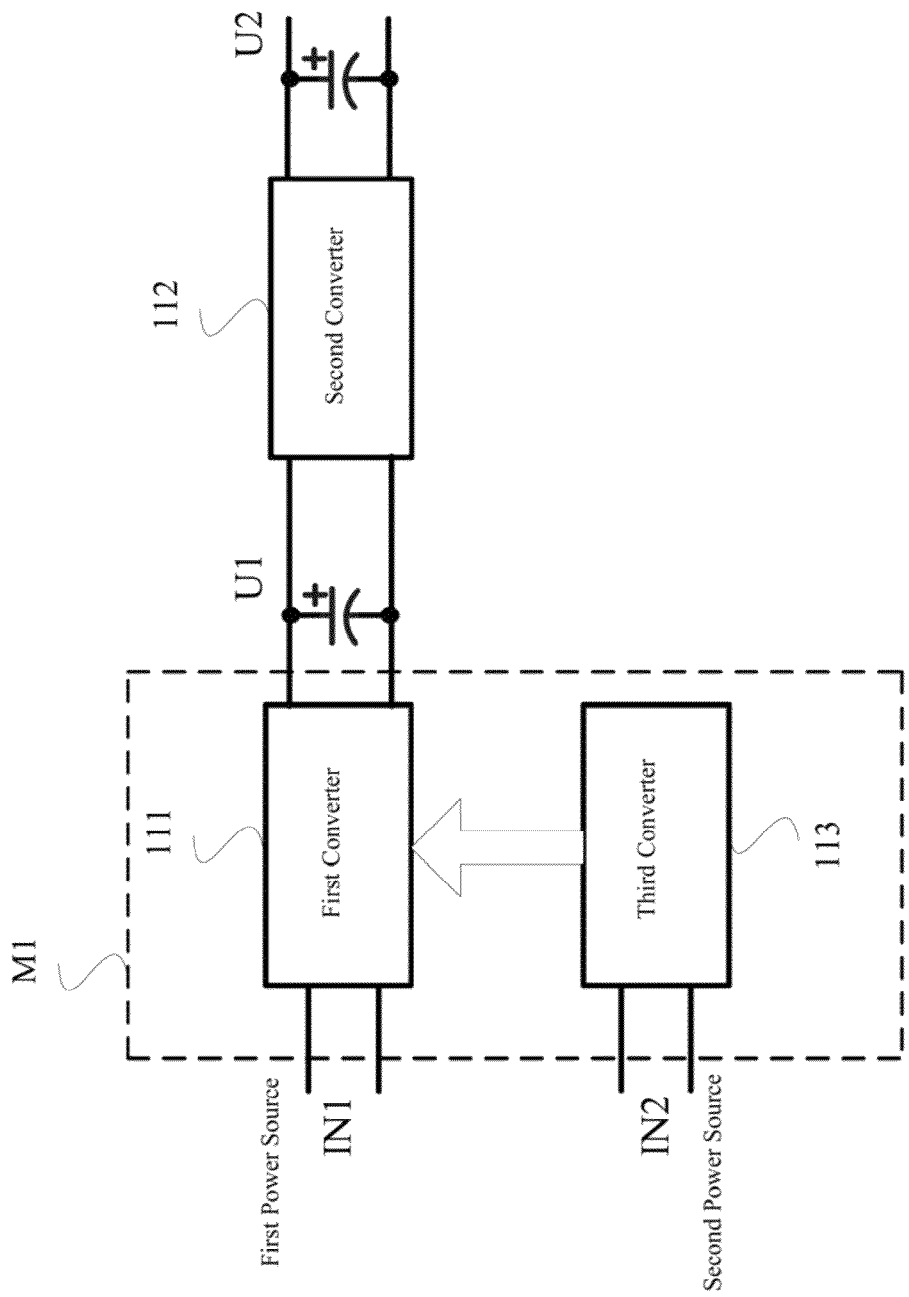
FIG. 11 is a structure diagram of a UPS for a UPS according to yet another aspect of the present invention.

FIG. 11 is a structure diagram of a UPS according to yet another aspect of the present invention. Referring to FIG. 11, the UPS includes a first power source module M1 and a second converter 112. The first power source module M1 includes a first converter 111 and a third converter 113. The first converter 111 includes a first input terminal IN1 and a first output terminal. The first input terminal IN1 receives a first power source; and the first output terminal outputs a first voltage U1 (e.g. 400V) after the first power source is processed by the first converter 111. The third converter 113 includes a third input terminal IN2. The third converter 113 is electrically coupled to the first converter 111, and the third input terminal IN2 receives a second power source. Herein, the first power source inputted to the first converter 111 is a DC power or an AC power, and the second power source inputted to the third converter 113 is a DC power (e.g. battery). Preferably, the UPS supplies power to the server.

The second converter 112 includes a second input terminal electrically connected to the first output terminal of the first converter 111 for receiving the first voltage U1, and a second output terminal for outputting a second voltage U2 corresponding to the first voltage U1.

Figure 12:
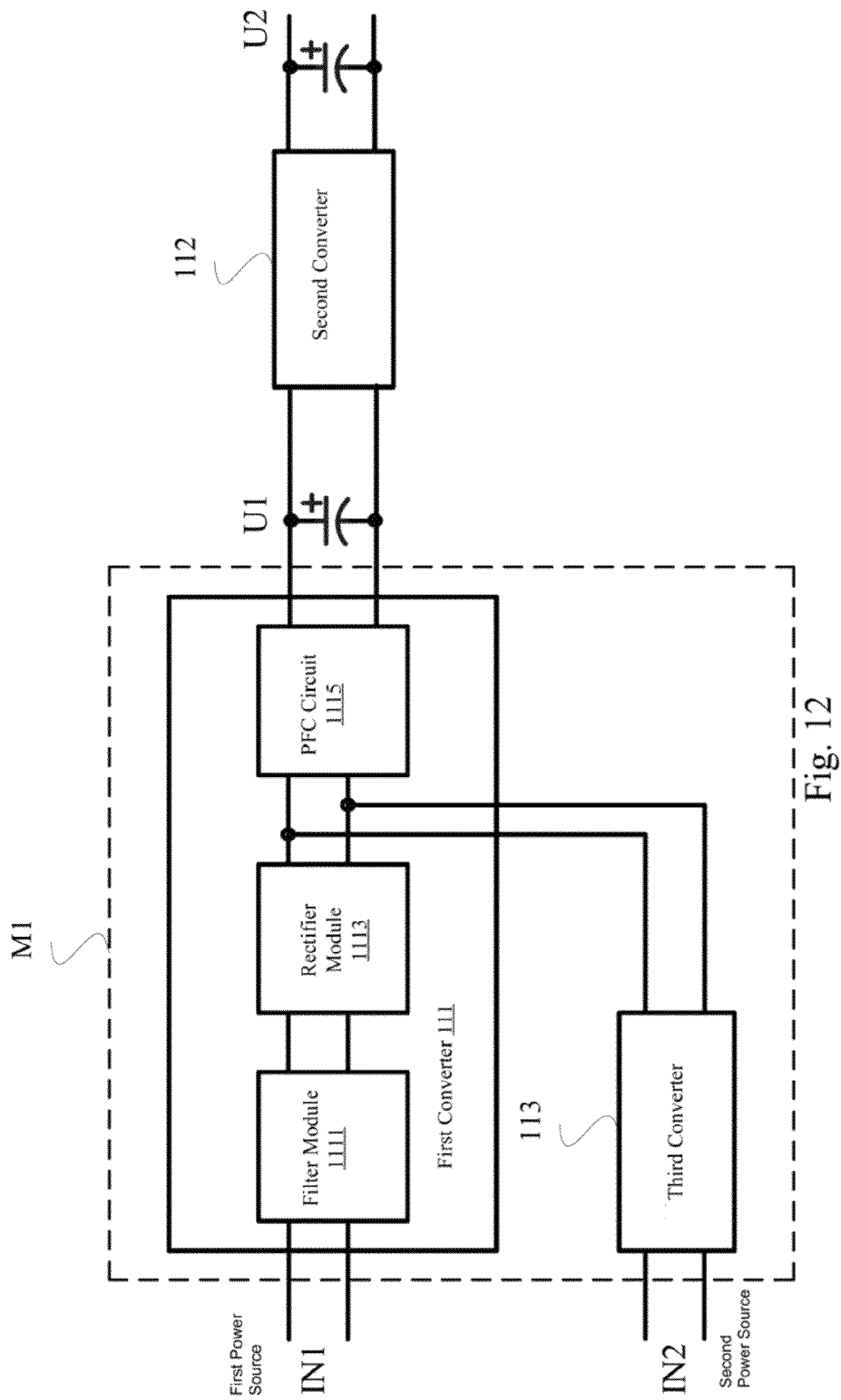
FIG. 12 is a structure diagram of a first power source module of the UPS in FIG. 11 according to a specific embodiment.

FIG. 12 is a structure diagram of a first power source module of the UPS in FIG. 11 according to a specific embodiment. Referring to FIG. 12, the first converter 111 includes a filter module 1111, a rectifier module 1113 and a PFC circuit 1115. The filter module 1111 filters the first power source. The input terminal of the rectifier module 1113 is electrically connected to the output terminal of the filter module 1111 for rectifying the filtered first power source; and the output terminal of the rectifier module 1113 is electrically connected to the third converter 113.

The PFC circuit 1115 is electrically connected to the output terminal of the rectifier module 1113 and the third converter 113, thereby adjusting the power factor of the first power source module M1. Preferably, the PFC circuit 1115 is an interleaved PFC circuit for reducing a ripple component of the output voltage of the first power source module while adjusting the power factor of the first power source module M1. Furthermore, it can be known from FIG. 12 that in addition to processing the voltage rectified by the rectifier module 1113 of the first converter 111 so as to adjust the power factor of the first converter, the PFC circuit 1115 of the first converter 111 may further adjust the ripple component of the output voltage of the third converter 113, thus adjusting the power factor of the third converter.

It would be understood by those skilled in the art that the circuit structures or the converter control modules of the first converter, the second converter and/or the third converter in the other preferred embodiments of FIG. 1 when being applicable to FIG. 10 should be included in the preferred embodiments of the UPS in FIG. 10 and are incorporated by reference herein.

In the application of the UPS of the present invention, the first converter converts the input AC power or DC power into the high-voltage DC power, and the second converter converts the high-voltage DC power into the low-voltage DC power. Meanwhile, the output terminal of the third converter is electrically connected to the output terminal of the first converter, so as to convert the DC input of the third converter into the required voltage for the second converter, which may greatly improve the working efficiency of the UPS. In addition, the second converter may adopt an isolation conversion and synchronous rectification design, so as to further reduce the system loss. In addition, the third converter may adopt an open-loop control method, so that the output of the third converter varies in accordance with the variation of the input, thereby adjusting the first voltage inputted to the second converter and enhancing the adjustment flexibility of the UPS.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. An uninterruptible power system (UPS), comprising:
    a first converter having a first input terminal for receiving a first power source and a first output terminal for outputting a first voltage, wherein the first power source is a DC power or an AC power, and the first voltage is a DC voltage;
    a third converter having a third input terminal for receiving a second power source and a third output terminal electrically connected to the first output terminal, wherein the second power source is a DC power, wherein the third converter is a first resonant converter; and
    a second converter having a second input terminal electrically connected to the first output terminal and the third output terminal, and a second output terminal for outputting a second voltage corresponding to the first voltage.

2. The uninterruptible power system of claim 1, further comprising:
    an auxiliary power source module electrically connected to one of the first input terminal, the third input terminal and the first output terminal, thereby receiving one of the first power source, the second power source and the first voltage correspondingly; and
    a control module electrically connected to the auxiliary power source module, thereby receiving a power supply source from the auxiliary power source module.

3. The uninterruptible power system of claim 1, further comprising:
    a converter control module having three input terminals respectively electrically connected to the first converter, the second converter and the third converter for receiving respective electrical signals, and three output terminals for respectively outputting control signals corresponding to the electrical signals.

4. The uninterruptible power system of claim 1, further comprising:
    three converter control modules, the converter control modules having respective input terminals electrically connected to the first converter, the second converter and the third converter respectively for receiving respective electrical signals, and respective output terminal for outputting control signals corresponding to the electrical signals respectively.

5. The uninterruptible power system of claim 4, wherein a control method for the first converter and the second converter is a close-loop control, and a control method for the third converter is an open-loop control or a close-loop control.

6. The uninterruptible power system of claim 1, wherein the first resonant converter comprises:
    a square-wave generator for outputting a square wave;
    a resonant slot electrically connected to the square-wave generator;
    a transformer having a primary winding electrically connected to the resonant slot and at least one secondary winding; and
    a rectifier module electrically connected to the secondary winding of the transformer for rectifying a voltage of the secondary winding.

7. The uninterruptible power system of claim 6, wherein the square-wave generator is a half-bridge square-wave generator or a full-bridge square-wave generator.

8. The uninterruptible power system of claim 6, wherein a resonance method of the resonant slot is serial resonance, parallel resonance or LLC resonance.

9. The uninterruptible power system of claim 1, wherein the third converter further comprises a filter module for filtering the second power source.

10. The uninterruptible power system of claim 9, wherein the filter module further comprises an EMI filter for performing common-mode filtering and/or differential-mode filtering on the second power source.

11. The uninterruptible power system of claim 9, wherein the filter module further comprises a surge current detection device for detecting a surge current when the second power source is inputted to the third input terminal and for performing surge current protection on the third converter.

12. The uninterruptible power system of claim 9, wherein the filter module further comprises a voltage polarity detection device for detecting if a voltage polarity of the second power source matches a terminal polarity of the third input terminal, so as to protect the third converter when the input terminal of the second power source is reversed.

13. The uninterruptible power system of claim 1, wherein the first converter further comprises a PFC (Power Factor Correction) circuit for adjusting a power factor of the first converter.

14. The uninterruptible power system of claim 13, wherein the first converter is an interleaved PFC circuit for adjusting a power factor of the first converter and reducing a ripple component of the output voltage.

15. The uninterruptible power system of claim 1, wherein the first converter further comprises a surge current protection device for detecting a transient surge current during the actuation of the first power source and for performing surge current protection on the first converter.

16. The uninterruptible power system of claim 1, wherein the second converter is a second resonant converter or a PWM converter.

17. The uninterruptible power system of claim 16, wherein the second converter is the second resonant converter, and the second resonant converter comprises:
    a square-wave generator for outputting a square wave;
    a resonant slot electrically connected to the square-wave generator;
    a transformer having a primary winding electrically connected to the resonant slot and at least one secondary winding; and
    a rectifier module electrically connected to the secondary winding of the transformer for rectifying a voltage of the secondary winding.

18. The uninterruptible power system of claim 16, wherein the second converter is a phase-shifted full-bridge converter and the phase-shifted full-bridge converter comprises:
    a phase-shifted square-wave generator for outputting a square wave;

a transformer having a primary winding electrically connected to an output terminal of the phase-shifted square-wave generator and a secondary winding; and a synchronous rectifier module electrically connected to the secondary winding for performing synchronous rectification on an output voltage of the transformer.

19. An uninterruptible power system, comprising:

a first converter having a first input terminal for receiving a first power source and a first output terminal for outputting a first voltage, wherein the first power source is a DC power or AC power and the first voltage is a DC voltage;

a third converter having a third input terminal for receiving a second power source and a third output terminal electrically connected to the first output terminal, wherein the second power source is a DC power, and the third converter is a resonant converter; and at least one second converter, each of the at least one second converter comprising:

an isolation unit having a first isolation side electrically coupled to the first output terminal for receiving the first voltage and a second isolation side; and a synchronous rectifier module electrically connected to the second isolation side for performing synchronous rectification on an output voltage of the isolation unit.

20. The uninterruptible power system of claim 19, wherein each of the at least one second converter is electrically connected to an output bus by an ORing field effect transistor, and the ORing field effect transistors are controlled by an ORing field effect transistor controller, wherein the ORing field effect transistor prevents the current from flowing back to the second output terminal of the corresponding second converter.

21. The uninterruptible power system of claim 19, further comprising:

an auxiliary power source module electrically connected to one of the first input terminal, the third input terminal and the first output terminal, thereby receiving one of the first power source, the second power source and the first voltage correspondingly; and a control module electrically connected to the auxiliary power source module for receiving a power supply source from the auxiliary power source module.

22. The uninterruptible power system of claim 19, further comprising:

a converter control module having three input terminals respectively electrically connected to the first converter, the second converter and the third converter for receiving respective electrical signals, and three output terminals for outputting control signals corresponding to the electrical signals respectively.

23. The uninterruptible power system of claim 19, further comprising:

three converter control modules, the converter control modules having respective input terminals electrically connected to the first converter, the second converter and the third converter respectively for receiving respective electrical signals, and respective output terminals for outputting control signals corresponding to the electrical signals respectively.

24. The uninterruptible power system of claim 23, wherein a control method for the first converter and the second converter is a close-loop control, and a control method for the third converter is an open-loop control or a close-loop control.

25. The uninterruptible power system of claim 19, wherein the first converter further comprises a PFC circuit for adjusting a power factor of the first converter.

26. The uninterruptible power system of claim 25, wherein the first converter is an interleaved PFC circuit for adjusting a power factor of the first converter and reducing a ripple component of the output voltage.

27. The uninterruptible power system of claim 19, wherein the first converter further comprises a surge current protection device for detecting a transient surge current during the actuation of the first power source and for performing surge current protection on the first converter.

28. A uninterruptible power system, comprising:

a first converter having a first input terminal for receiving a first power source and a first output terminal for outputting a first voltage, wherein the first power source is a DC power or AC power and the first voltage is a DC voltage;

a third converter having a third input terminal for receiving a second power source and a third output terminal electrically connected to the first output terminal, wherein the second power source is a DC power, and the third converter is a resonant converter; and a second converter having a second input terminal electrically connected to the first output terminal and the third output terminal, and a second output terminal for outputting a second voltage corresponding to the first voltage, wherein the output voltage of the third output terminal varies in accordance with a variation of the DC power received by the third input terminal.

29. The uninterruptible power system of claim 28, further comprising:

an auxiliary power source module electrically connected to one of the first input terminal, the third input terminal and the first output terminal, thereby receiving one of the first power source, the second power source and the first voltage correspondingly; and a control module electrically connected to the auxiliary power source module for receiving a power supply source from the auxiliary power source module.

30. The uninterruptible power system of claim 28, further comprising:

a converter control module having three input terminals respectively electrically connected to the first converter, the second converter and the third converter for receiving respective electrical signals, and three output terminals for outputting control signals corresponding to the electrical signal respectively.

31. The uninterruptible power system of claim 28, further comprising:

three converter control modules, the converter control modules having respective input terminals electrically connected to the first converter, the second converter and the third converter respectively for receiving respective electrical signals, and respective output terminals for outputting control signals corresponding to the electrical signals respectively.

32. The uninterruptible power system of claim 28, wherein the resonant converter comprises:

a square-wave generator for outputting a square wave;

a resonant slot electrically connected to the square-wave generator;

a transformer having a primary winding electrically connected to the resonant slot and at least one secondary winding; and a rectifier module electrically connected to the secondary winding of the transformer for rectifying a voltage of the secondary winding.

33. The uninterruptible power system of claim 32, wherein the square-wave generator is a half-bridge square-wave generator or a full-bridge square-wave generator.

34. The uninterruptible power system of claim 32, wherein a resonance method of the resonant slot is serial resonance, parallel resonance or LLC resonance.

35. The uninterruptible power system of claim 28, wherein the third converter further comprises a filter module for filtering the second power source.

36. The uninterruptible power system of claim 35, wherein the filter module further comprises an EMI filter for performing common-mode filtering and/or differential-mode filtering on the second power source.

37. The uninterruptible power system of claim 35, wherein the filter module further comprises a surge current detection device for detecting a surge current when the second power source is inputted to the third input terminal and for performing surge current protection on the third converter.

38. The uninterruptible power system of claim 35, wherein the filter module further comprises a voltage polarity detection device for detecting if a voltage polarity of the second power source matches a terminal polarity of the third input terminal, so as to protect the third converter when the input terminal of the second power source is reversed.

39. An uninterruptible power system, comprising:
a first power source module, comprising:
a first converter having a first input terminal for receiving a first power source and a first output terminal for outputting a first voltage, wherein the first power source is a DC power or AC power and the first voltage is a DC voltage; and
a third converter electrically coupled to the first converter for receiving a second power source, wherein the second power source is a DC power, and the third converter is a resonant converter; and
a second converter having a second input terminal electrically connected to the first output terminal of the first converter for receiving the first voltage and a second output terminal for outputting a second voltage corresponding to the first voltage.

40. The uninterruptible power system of claim 39, wherein the first converter further comprises a filter module for filtering the first power source.

41. The uninterruptible power system of claim 40, wherein the first converter further comprises a rectifier module having an input terminal electrically connected to an output terminal of the filter module for rectifying the filtered first power source, and an output terminal electrically connected to the third converter.

42. The uninterruptible power system of claim 41, wherein the first converter further comprises a PFC circuit electrically connected to the output terminal of the rectifier module and the third converter for adjusting a power factor of the first power source module.

43. The uninterruptible power system of claim 42, wherein the PFC circuit is an interleaved PFC circuit for adjusting a power factor of the first power source module and reducing a ripple component of the voltage.

44. The uninterruptible power system of claim 39, wherein the power system for the UPS supplies power to the server.

45. The uninterruptible power system of claim 39, wherein the second power source is a battery.

* * * * *